(12) United States Patent
Kimura (10) Patent No.: US 11,143,805 B2
(45) Date of Patent: Oct. 12, 2021

(54) POLARIZING PLATE, POLARIZING PLATE MANUFACTURING METHOD, AND OPTICAL APPARATUS

(71) Applicant: Dexerials Corporation, Tokyo (JP)

(72) Inventor: Takahiro Kimura, Tokyo (JP)

(73) Assignee: Dexerials Corporation, Tokyo (JP)

( * ) Notice: Subject to any disclaimer, the term of this patent is extended or adjusted under 35 U.S.C. 154(b) by 45 days.

(21) Appl. No.: 16/141,546

(22) Filed: Sep. 25, 2018

(65) Prior Publication Data

US 2019/0094437 A1 Mar. 28, 2019

(30) Foreign Application Priority Data

Sep. 27, 2017 (JP) .............................. JP2017-186493

(51) Int. Cl.
*G02B 1/18* (2015.01)
*G02B 5/30* (2006.01)
(Continued)

(52) U.S. Cl.
CPC ...... *G02B 5/3058* (2013.01); *B29D 11/00644* (2013.01); *B29D 11/00932* (2013.01); *G02B 27/281* (2013.01)

(58) Field of Classification Search
CPC .............. B29D 11/00644; B29D 11/00; B29D 11/00932; G02B 27/281; G02B 5/3058;
(Continued)

(56) References Cited

U.S. PATENT DOCUMENTS 3,880,496 A * 4/1975 Davidyan ............ G02B 27/281
359/490.02
5,999,317 A * 12/1999 Whitney ................ A63H 33/22
359/489.12
(Continued)

FOREIGN PATENT DOCUMENTS

GN       103278946 A     9/2013
JP       2000-206507 A   7/2000
(Continued)

OTHER PUBLICATIONS

Examiner provided machine translation of Chen et al. (CN 103278946 A) (Year: 2013).*
(Continued)

*Primary Examiner* — Balram T Parbadia
(74) *Attorney, Agent, or Firm* — Osha Bergman Watanabe & Burton LLP (57) ABSTRACT

To provide a polarizing plate capable of improving durability of a polarizing plate and productivity of an optical apparatus, a polarizing plate manufacturing method, and an optical apparatus. Provided is a polarizing plate with a wire grid structure, including: a transparent substrate; and a grid-shaped convex portion arranged on the transparent substrate on one surface side of the polarizing plate at a pitch shorter than a wavelength of light of a use band and extending in a predetermined direction, wherein one surface of the polarizing plate is provided with a water-repellent layer covering a surface of the grid-shaped convex portion, and wherein a side surface of the polarizing plate is not provided with the water-repellent layer.

9 Claims, 2 Drawing Sheets

(51) Int. Cl.
*B29D 11/00* (2006.01)
*G02B 27/28* (2006.01)

(58) Field of Classification Search
CPC . G02B 27/28; G02B 5/30; G02B 1/18; G02B 1/10
See application file for complete search history.

(56) References Cited

U.S. PATENT DOCUMENTS

| | | | | |
|---|---|---|---|---|
| 8,416,371 | B2* | 4/2013 | Kumai | G02B 5/3058 349/96 |
| 9,977,168 | B2* | 5/2018 | Kumai | H04N 9/3167 |
| 2003/0095257 | A1* | 5/2003 | Wijntjes | G01D 5/34715 356/364 |
| 2003/0227678 | A1 | 12/2003 | Lines et al. | |
| 2005/0046943 | A1* | 3/2005 | Suganuma | G02B 5/3058 359/487.03 |
| 2008/0049191 | A1 | 2/2008 | Endo | |
| 2011/0170187 | A1* | 7/2011 | Sawaki | G02B 5/3058 359/485.03 |
| 2012/0105745 | A1* | 5/2012 | Kumai | G02F 1/133528 349/5 |
| 2013/0128358 | A1* | 5/2013 | Hanashima | B82Y 20/00 359/487.03 |
| 2013/0215508 | A1* | 8/2013 | Sasaki | G02B 5/3058 359/488.01 |
| 2013/0250411 | A1 | 9/2013 | Bangerter et al. | |
| 2013/0286358 | A1* | 10/2013 | Takahashi | G02B 5/3008 353/20 |
| 2013/0342794 | A1* | 12/2013 | Okada | G02B 1/118 349/96 |
| 2014/0144875 | A1* | 5/2014 | Lim | G02B 5/3058 216/24 |
| 2015/0060396 | A1* | 3/2015 | Kaida | G02B 5/3058 216/13 |
| 2015/0331166 | A1* | 11/2015 | Hanashima | C23C 16/44 359/485.05 |
| 2016/0077263 | A1* | 3/2016 | Kwak | G02B 5/3058 349/96 |
| 2016/0077264 | A1* | 3/2016 | Kang | G03F 7/0002 430/321 |
| 2016/0124133 | A1* | 5/2016 | Han | G02B 5/3058 349/43 |
| 2016/0170115 | A1* | 6/2016 | Kim | G02B 5/3058 359/485.05 |
| 2016/0252657 | A1* | 9/2016 | Kuo | G02B 1/14 359/487.01 |
| 2016/0291208 | A1* | 10/2016 | Wangensteen | G02B 1/14 |
| 2016/0299273 | A1* | 10/2016 | Oh | H01L 21/0332 |
| 2018/0217308 | A1* | 8/2018 | Nam | B42D 25/324 |
| 2018/0299602 | A1 | 10/2018 | Takeda et al. | |

FOREIGN PATENT DOCUMENTS

| | | |
|---|---|---|
| JP | 2006-507517 A | 3/2006 |
| JP | 2008-077056 A | 4/2008 |
| JP | 2008-216956 A | 9/2008 |
| JP | 2012-103728 A | 5/2012 |
| JP | 2012-108468 A | 6/2012 |
| JP | 2013-218294 A | 10/2013 |
| JP | 2014-085516 A | 5/2014 |
| JP | 2015108845 A | 6/2015 |
| JP | 2015-180975 A | 10/2015 |
| JP | 2018151545 A | 9/2018 |
| WO | 2017073044 A1 | 5/2017 |

OTHER PUBLICATIONS

Office Action issued in counterpart Japanese Patent Application No. 2017-186493, dated May 8, 2018 (3 Pages).
Office Action issued in counterpart Japanese Patent Application No. 2017-186493, dated Dec. 5, 2017 (3 Pages).
Reconsideration Report by Examiner before Appeal issued in the JP Patent Application No. 2017-186493 (Appeal No. 2018-010675), dated Oct. 4, 2018.
Office Action issued in Chinese Application No. 201811057260.7; dated Apr. 16, 2021 (15 pages).

* cited by examiner

POLARIZING PLATE, POLARIZING PLATE MANUFACTURING METHOD, AND OPTICAL APPARATUS

This application is based on and claims the benefit of priority from Japanese Patent Application No. 2017-186493, filed on 27 Sep. 2017, the content of which is incorporated herein by reference.

BACKGROUND OF THE INVENTION

Field of the Invention

The present invention relates to a polarizing plate, a polarizing plate manufacturing method, and an optical apparatus.

Related Art

A polarizing plate is an optical element which absorbs polarized light in an absorption axis direction and transmits polarized light in a transmission axis direction orthogonal thereto. In recent years, an absorption type polarizing plate having a wire grid structure has been used in an optical apparatus such as a liquid crystal projector. In the absorption type polarizing plate, it is necessary to make the period of the grid as a submicron order in order to satisfy desired optical characteristics in the visible light band. For that reason, the width of each of a reflection layer, a dielectric layer and an absorption layer constituting the grid becomes several tens of nanometers.

Incidentally, since the polarizing plate is used under high humidity and dust (PM 2.5 or the like) environment, the grid is exposed to a high temperature in practical use because the polarizing plate is of an absorption type. For that reason, oxidation or corrosion of the surface of the grid occurs. Even if the oxidation or corrosion of only the surface occurs, the optical characteristics are greatly influenced since the size is in the order of nanometers. Here, there have been proposed various techniques of improving the durability of the polarizing plate while preventing a bad influence on optical characteristics.

For example, there is disclosed a polarizing plate including a monomolecular layer formed of a corrosion inhibitor on a surface of a polarizing plate with a wire grid structure (for example, see Patent Document 1). According to the polarizing plate, when the thickness of the monomolecular layer is set to be smaller than about 100 angstroms, it is possible to prevent corrosion without giving a bad influence on the optical characteristics.

Further, for example, there is disclosed a polarizing plate with a wire grid structure in which a surface of the polarizing plate is provided with a standard region having standard characteristics and disposed at the center of the polarizing plate and a correction region having characteristics different from the standard characteristics and disposed at the end portion of the polarizing plate (for example, see Patent Document 2). According to the polarizing plate, since the adjacent grids are mutually fused by collapsing the grid in the correction region, it is possible to prevent the corrosion of the grid due to the infiltration of a fluid such as fat and water from the end portion according to a capillary phenomenon.

Further, for example, there is disclosed a polarizing plate in which inorganic fine particles such as silica are coated on a surface of a polarizing plate with a wire grid structure (for example, see Patent Document 3). According to the polarizing plate, since the inorganic protection film such as a silica layer is provided, durability can be improved.

Patent Document 1: Japanese Unexamined Patent Application (Translation of PCT Application), Publication No. 2006-507517

Patent Document 2: Japanese Unexamined Patent Application, Publication No. 2013-218294

Patent Document 3: Japanese Unexamined Patent Application, Publication No. 2012-103728

SUMMARY OF THE INVENTION

Incidentally, for example, in a liquid crystal projector of 3 LCD type, three kinds of liquid crystal panels corresponding to each color of blue, green, and red are used and polarizing plates are disposed on the incident side and the emission side so as to sandwich each liquid crystal panel. Further, there is a case in which a polarizing plate called a pre-polarizing plate with a low extinction ratio may be disposed in front of the polarizing plate on the incident side in order to reduce the heat load of each polarizing plate and the number of the polarizing plates in use becomes nine sheets at maximum when including the pre-polarizing plate. For that reason, it is important to easily identify the polarizing plate from the viewpoint of preventing a human error and improving productivity of an optical apparatus such as a liquid crystal projector.

As a method of identifying the polarizing plate, there is known a method of printing product information on an ineffective surface of a front or rear surface of the polarizing plate and a side surface of an end portion of the polarizing plate using laser marking, a marking pen, a diamond cutter, or the like. When it is difficult to print product information since the ineffective area is small, the product information is essentially printed on the side surface of the end portion. In this regard, in the conventional general protection film forming method, the protection film is formed on not only the surface of the polarizing plate but also the side surface thereof. Accordingly, when the product information is printed on such a side surface, the protection film is peeled and hence dust may be generated. Particularly, when the protection film is a water-repellent film, there is concern that the product information cannot be printed by a marking pen. Further, in the polarizing plate disclosed in Patent Document 2, since the collapsed grid covers the side surface of the end portion, there is concern that marking may be disturbed.

The invention has been made in view of the above-described circumstances and an object of the invention is to provide a polarizing plate capable of improving durability of a polarizing plate and productivity of an optical apparatus, a polarizing plate manufacturing method, and an optical apparatus.

(1) In order to achieve the above-described object, an aspect of the invention provides a polarizing plate (for example, a polarizing plate 1 to be described later) with a wire grid structure including: a transparent substrate (for example, a transparent substrate 2 to be described later); and a grid-shaped convex portion (for example, a grid-shaped convex portion 3 to be described later) arranged on the transparent substrate on one surface side of the polarizing plate at a pitch shorter than a wavelength of light of a use band and extending in a predetermined direction, in which one surface of the polarizing plate is provided with water-repellent layers (for example, water-repellent layers 4 and 41 to be described later) covering a surface of the grid-shaped convex portion and a side surface of the polarizing plate is not provided with the water-repellent layer.

(2) In the polarizing plate according to (1), the transparent substrate may be exposed at the side surface of the polarizing plate.

(3) In the polarizing plate according to (1) or (2), the side surface of the polarizing plate may be subjected to an identification marking.

(4) In the polarizing plate according to any one of (1) to (3), the other surface of the polarizing plate may be provided with water-repellent layers (for example, water-repellent layers 42 and 4 to be described later).

(5) In the polarizing plate according to any one of (1) to (4), the water-repellent layer may include a silica layer formed of silica and a silane coupling layer formed of a silane coupling agent in order from the transparent substrate.

(6) In the polarizing plate according to (5), the silane coupling layer may include fluorine.

(7) In the polarizing plate according to any one of (1) to (6), the transparent substrate may be transparent to the wavelength of light of a use band and may be formed of glass, crystal, or sapphire.

(8) In the polarizing plate according to any one of (1) to (7), the polarizing plate may further include a heat conduction plate which is disposed on the other surface of the transparent substrate and is formed of sapphire.

(9) Further, another aspect of the invention provides a method of manufacturing a polarizing plate with a wire grid structure, including: a grid-shaped convex portion forming step of forming a grid-shaped convex portion extending in a predetermined direction at a pitch shorter than a wavelength of light of a use band at one surface side of a transparent substrate larger than a use size of the polarizing plate; a water-repellent layer forming step of forming a water-repellent layer covering a surface of the transparent substrate and a surface of the grid-shaped convex portion at one surface side of the transparent substrate; and a cutting step of cutting the transparent substrate provided with the water-repellent layer into the use size.

(10) Further, another aspect of the invention provides a method of manufacturing a polarizing plate with a wire grid structure, including: a grid-shaped convex portion forming step of forming a grid-shaped convex portion extending in a predetermined direction at a pitch shorter than a wavelength of light of a use band at one surface side of a transparent substrate equal to a use size of the polarizing plate; a water-repellent layer forming step of forming a water-repellent layer covering a surface of the transparent substrate and a surface of the grid-shaped convex portion at one surface side of the transparent substrate; and a removing step of removing the water-repellent layer formed on a side surface of the transparent substrate by etching.

(11) Further, another aspect of the invention provides an optical apparatus including the polarizing plate according to any one of (1) to (8).

According to the invention, it is possible to provide a polarizing plate capable of improving durability of a polarizing plate and productivity of an optical apparatus, a polarizing plate manufacturing method, and an optical apparatus.

DETAILED DESCRIPTION OF THE INVENTION

Hereinafter, an embodiment of the invention will be described in detail with reference to the drawings.

[Polarizing Plate 1]

A polarizing plate 1 according to an embodiment of the invention is an inorganic polarizing plate with a wire grid structure. The polarizing plate 1 according to the embodiment includes a transparent substrate 2 and a grid-shaped convex portion 3 arranged on the transparent substrate 2 on one surface side of the polarizing plate 1 at a pitch shorter than a wavelength of light of a use band and extending in a predetermined direction. Further, one surface of the polarizing plate 1 is provided with a water-repellent layer 4 which covers a surface of the grid-shaped convex portion 3 and a side surface of the polarizing plate 1 is not provided with the water-repellent layer.

Figure 1:
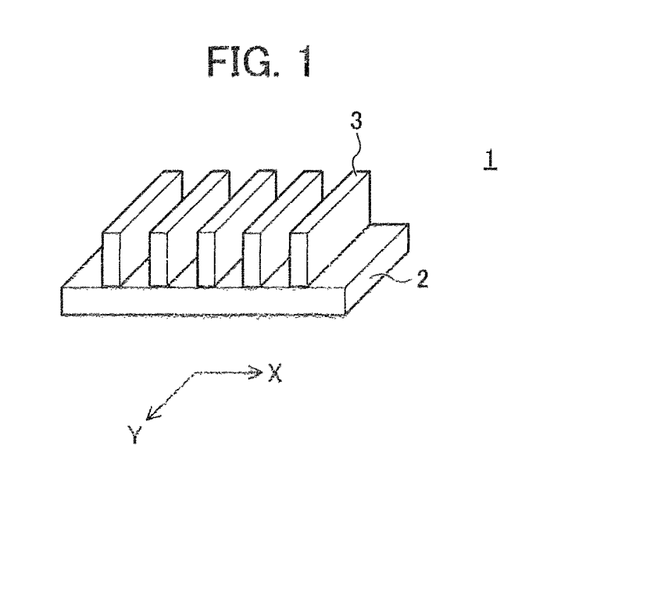
FIG. 1 is a perspective view of a polarizing plate according to an embodiment of the invention.
Figure 2:
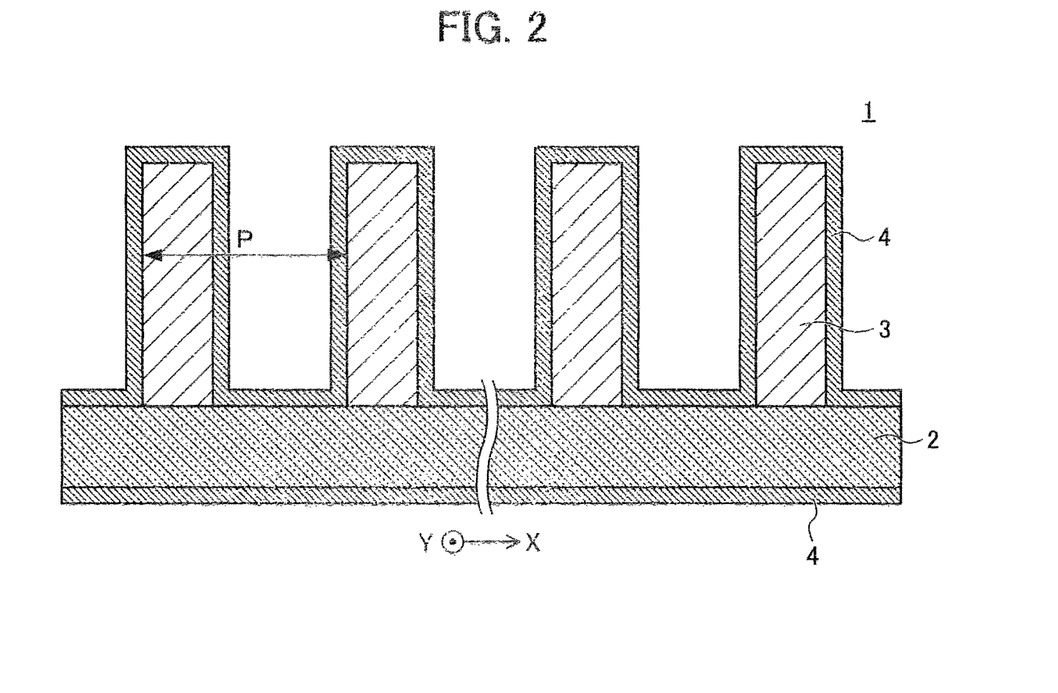
FIG. 2 is a cross-sectional view of the polarizing plate according to the above-described embodiment.

FIG. 1 is a perspective view of the polarizing plate 1 according to the embodiment. FIG. 2 is a cross-sectional view of the polarizing plate 1 according to the embodiment. As illustrated in FIGS. 1 and 2, the extension direction of the grid-shaped convex portion 3 (a predetermined direction) will be referred to as the Y-axis direction. Further, a direction which is orthogonal to the Y-axis direction and in which the grid-shaped convex portion 3 is arranged along a main surface of the transparent substrate 2 will be referred to as the X-axis direction. In this case, light which is incident to the polarizing plate 1 is appropriately incident from a direction orthogonal to the X-axis direction and the Y-axis direction at a position provided with the grid-shaped convex portion 3 in the transparent substrate 2.

The polarizing plate 1 attenuates the polarized wave (TE wave (S wave)) having an electric field component parallel to the Y-axis direction and transmits the polarized wave (TM wave (P wave)) having an electric field component parallel to the X-axis direction by using four functions of transmission, reflection, interference, and selective light absorption of polarized waves by optical anisotropy. Thus, the Y-axis direction is the direction of the absorption axis of the polarizing plate 1 and the X-axis direction is the direction of the transmission axis of the polarizing plate 1.

The transparent substrate 2 is not particularly limited as long as the substrate has translucency for the light of a use band and can be appropriately selected in accordance with a purpose. The "translucency for the light of a use band" does not mean that the transmittance of the light of a use band is 100% and may be the translucency capable of keeping the function as the polarizing plate. As the light of a use band, for example, visible light having a wavelength of about 380 nm to 810 nm can be exemplified.

The shape of the main surface of the transparent substrate 2 is not particularly limited and a shape (for example, a rectangular shape) is appropriately selected according to a purpose. An average thickness of the transparent substrate 2 is preferably, for example, 0.3 mm to 1 mm.

As a material forming the transparent substrate 2, a material having a refractive index of 1.1 to 2.2 is preferable and glass, crystal, sapphire, or the like can be exemplified. From the viewpoint of cost and transmittance, glass, particularly, quartz glass (a refractive index of 1.46) or soda lime glass (a refractive index of 1.51) is preferably used. The composition of the components of the glass material is not particularly limited and, for example, an inexpensive glass material such as silicate glass widely distributed as optical glass can be used.

Further, from the viewpoint of thermal conductivity, crystal or sapphire having high thermal conductivity is preferably used. Accordingly, since high light resistance against strong light is obtained, the polarizing plate is preferably used as a polarizing plate for an optical engine of a projector with a large heat generation amount. Alternatively, a heat conduction plate which is formed of sapphire may be disposed on the other surface of the transparent substrate 2. When such a heat conduction plate is disposed to be in contact with the other surface of the transparent substrate 2, it is possible to obtain high heat resistance and to improve the durability of the polarizing plate 1.

Further, when a transparent substrate formed of optically active crystals such as crystal is used, it is preferable to dispose the grid-shaped convex portion 3 in a direction parallel to or perpendicular to the optical axis of the crystal. Accordingly, excellent optical characteristics can be obtained. Here, the optical axis indicates a direction axis in which a difference in refractive index between 0 (ordinary ray) and E (extraordinary ray) of the light traveling in that direction becomes minimal.

The grid-shaped convex portion 3 is arranged on one surface of the transparent substrate 2 in a one-dimensional shape at a pitch shorter than the wavelength of light of a use band and extends in a predetermined direction. The grid-shaped convex portion 3 is formed in a square column shape extending from the transparent substrate 2 in a perpendicular direction. The grid-shaped convex portion 3 is formed by laminating a reflection layer, a dielectric layer, and an absorption layer (not illustrated) in order from the transparent substrate 2. That is, the polarizing plate 1 according to the embodiment is an absorption type polarizing plate with a wire grid structure.

For that reason, light which is incident from a position provided with the grid-shaped convex portion 3 in the polarizing plate 1 is attenuated while being partially absorbed when passing through the absorption layer and the dielectric layer. In the light which is transmitted through the absorption layer and the dielectric layer, the polarized wave (TM wave (P wave)) is transmitted through the reflection layer with high transmittance. Meanwhile, in the light which is transmitted through the absorption layer and the dielectric layer, the polarized wave (TE wave (S wave)) is reflected by the reflection layer. When the TE wave which is reflected by the reflection layer passes through the absorption layer and the dielectric layer, a part of the TE wave is absorbed and reflected to be returned to the reflection layer. Further, when the TE wave which is reflected by the reflection layer passes through the absorption layer and the dielectric layer, the TE wave is attenuated by interference. When the polarizing plate 1 selectively attenuates the TE wave as described above, desired polarizing characteristics can be obtained.

Here, the height of the grid-shaped convex portion 3 means the dimension in a direction perpendicular to the main surface of the transparent substrate 2 and the width of the grid-shaped convex portion 3 means the dimension of the X-axis direction orthogonal to the height direction as viewed from the Y-axis direction following the extension direction of the grid-shaped convex portion 3. Further, an interval in the X-axis direction of the grid-shaped convex portion 3 when the polarizing plate 1 is viewed from the Y-axis direction following the extension direction of the grid-shaped convex portion 3 will be referred to as a pitch P.

The height of the grid-shaped convex portion 3 is preferably 10 nm or more. Since the height of the grid-shaped convex portion 3 is 10 nm or more, desired optical characteristics can be obtained and more satisfactory water repellency is exhibited. The height of the grid-shaped convex portion 3 can be measured by the observation using a scanning electron microscope or a transmission electron microscope. For example, the height of the grid-shaped convex portion 3 at four arbitrary positions is measured by using the scanning electron microscope or the transmission electron microscope and the arithmetic mean value thereof can be set to the height of the grid-shaped convex portion 3. Hereinafter, this measurement method will be referred to as electron microscopy.

The width of the grid-shaped convex portion 3 is preferably 35 to 45 nm. Since the width of the grid-shaped convex portion 3 is within this range, desired optical characteristics can be obtained and more satisfactory water repellency is exhibited. The width of the grid-shaped convex portion 3 can be measured by, for example, the above-described electron microscopy.

The pitch P of the grid-shaped convex portion 3 (see FIG. 2) is not particularly limited as long as the pitch is shorter than the half of the wavelength of light of a use band. From the viewpoint of ease of production and stability, the pitch P of the grid-shaped convex portion 3 is preferably, for example, 100 nm to 200 nm. When the pitch P of the grid-shaped convex portion 3 is within this range, desired optical characteristics can be obtained and more satisfactory water repellency is exhibited. The pitch P of the grid-shaped convex portion 3 can be measured by, for example, the above-described electron microscopy.

The reflection layer is formed as a metal film which extends in a band shape in the Y-axis direction corresponding to the absorption axis. The reflection layer attenuates the polarized wave (TE wave (S wave)) having an electric field component parallel to the longitudinal direction of the reflection layer and transmits the polarized wave (TM wave (P wave)) having an electric field component in a direction orthogonal to the longitudinal direction of the reflection layer. A material forming the reflection layer is not particularly limited as long as the material is reflective to the light of a use band. For example, a single element such as Al, Ag, Cu, Mo, Cr, Ti, Ni, W, Fe, Si, Ge, and Te or an alloy including one or more these elements can be exemplified. Among these, the reflection layer is preferably formed of aluminum or aluminum alloy. Additionally, in addition to these metal materials, for example, the reflection layer may be formed by an inorganic film or a resin film other than a metal formed with a high surface reflectance by coloring or the like.

The dielectric layer is formed on the reflection layer and a dielectric film extending in a band shape in the Y-axis direction corresponding to the absorption axis is arranged. As a material forming the dielectric layer, general materials like Si oxide such as $SiO_2$, metal oxide such as $Al_2O_3$, beryllium oxide, and bismuth oxide, $MgF_2$, cryolite, germanium, titanium dioxide, silicon, magnesium fluoride, boron nitride, boron oxide, tantalum oxide, carbon, or a combination thereof can be exemplified. Among these, the dielectric layer is preferably formed of Si oxide.

The absorption layer is formed on the dielectric layer and is arranged to extend in a band shape in the Y-axis direction corresponding to the absorption axis. As the material forming the absorption layer, one or more materials which have a light absorbing action and in which an extinction constant of an optical constant is not zero like a metal material, a semiconductor material or the like can be exemplified and these materials are appropriately selected depending on the wavelength range of light to be applied. As the metal material, a single element such as Ta, Al, Ag, Cu, Au, Mo, Cr, Ti, W, Ni, Fe, and Sn or an alloy including at least one of these elements can be exemplified. Further, as the semiconductor material, Si, Ge, Te, ZnO, and silicide materials ($\beta$-FeSi$_2$, MgSi$_2$, NiSi$_2$, BaSi$_2$, CrSi$_2$, CoSi$_2$, TaSi, and the like) can be exemplified. By using these materials, the polarizing plate 1 can obtain a high extinction ratio with respect to the visible light range to be applied. Among these, the absorption layer preferably includes Fe or Ta and further includes Si.

The water-repellent layer 4 is formed on one surface of the polarizing plate 1, that is, a surface provided with the grid-shaped convex portion 3 and covers the surface of the grid-shaped convex portion 3. In the embodiment, as illustrated in FIG. 2, the water-repellent layer 4 is also formed inside each groove between the adjacent grid-shaped convex portions 3 and the water-repellent layer 4 is formed to cover one entire surface of the polarizing plate 1. Accordingly, for example, even when water droplets adhere to one surface of the polarizing plate 1 due to condensation or the like, the water droplets immediately flow to be removed while not staying on one surface of the polarizing plate 1 generally disposed vertically inside the optical apparatus such as a liquid crystal projector (so that the thickness direction of the polarizing plate 1 becomes substantially the horizontal direction). For that reason, it is possible to prevent a problem in which water droplets adhering to one surface of the polarizing plate for a long time absorb dust or the like in an atmosphere so that a stain or the like occurs and a bad influence on optical characteristics occurs. That is, it is possible to obtain excellent moisture resistance and to improve the durability of the polarizing plate 1.

Further, since the surface of the grid-shaped convex portion 3 is covered with the water-repellent layer 4, it is possible to protect the surface of the grid-shaped convex portion 3. For that reason, since it is possible to prevent the oxidization and corrosion of the surface of the grid-shaped convex portion 3, it is possible to improve the durability of the polarizing plate 1.

Further, in the embodiment, the water-repellent layer 4 is also formed on the other surface of the polarizing plate 1 and is formed to cover the entire other surface of the polarizing plate 1. Accordingly, it is possible to prevent a problem in which water droplets adhering to the other surface of the polarizing plate 1 for a long time absorb dust or the like in an atmosphere so that a stain or the like occurs and a bad influence on optical characteristics occurs. That is, it is possible to obtain more excellent moisture resistance and to further improve the durability of the polarizing plate 1.

The thickness of the water-repellent layer 4 is not particularly limited. The thickness can be appropriately set in a range not giving a bad influence on the optical characteristics of the polarizing plate 1. Specifically, the thickness of the water-repellent layer 4 is preferably 1 to 3 nm.

The water-repellent layer 4 preferably includes a silica layer (not illustrated) formed of silica and a silane coupling layer (not illustrated) formed of a silane coupling agent in order from the transparent substrate 2.

The silica layer is formed of silica. The silica layer is formed to cover all of the surface of the transparent substrate 2 and the surface of the grid-shaped convex portion 3. A silanol group exists on the surface of the silica layer and undergoes a condensation reaction with the silane coupling agent in the silane coupling layer described later which is laminated so as to cover the surface of the silica layer. Accordingly, since the silane coupling layer is strongly coupled onto the silica layer, the peeling of the silane coupling layer can be prevented. Thus, the polarizing plate 1 according to the embodiment can maintain excellent water resistance, moisture resistance, and stain resistance for a long time and has high durability.

The thickness of the silica layer is preferably 20 nm or less. When the thickness of the silica layer is 20 nm or less, it is possible to maintain excellent water resistance, moisture resistance, and stain resistance for a long time while maintaining desired optical characteristics. Further, the thickness of the silica layer is preferably 1/10 or less of the pitch P. Accordingly, it is possible to maintain more excellent water resistance, moisture resistance, and stain resistance for a long time. Additionally, the silica layer can be formed by using, for example, a chemical vapor deposition (CVD) or an atomic layer deposition (ALD).

The silane coupling layer is formed of a, silane coupling agent. The silane coupling layer is formed to cover the entire surface of the silica layer. As described above, the silane coupling agent forming the silane coupling layer is strongly coupled to the silica layer by a condensation reaction with the silanol group existing on the surface of the silica layer.

The silane coupling layer preferably includes fluorine. More specifically, the silane coupling layer is preferably formed of a fluorine-based silane coupling agent such as perfluorodecyltriethoxysilane (FDTS). Accordingly, it is possible to obtain more excellent water resistance, moisture resistance, and stain resistance for a long time. Additionally, the silane coupling layer can be formed by using dipping or the like other than, for example, the above-described CVD or ALD.

Meanwhile, the side surface of the polarizing plate 1 is not provided with the water-repellent layer. More specifically, the side surface of the polarizing plate 1 is not provided with the water-repellent layer and the transparent substrate 2 is exposed. For that reason, the side surface of the polarizing plate 1 has hydrophilicity. Here, the side surface of the polarizing plate 1 means a surface extending in the thickness direction of the polarizing plate 1 and constitutes the side surface of the outer peripheral end portion of the polarizing plate 1.

As described above, since a coating layer such as a water-repellent layer is not formed on the side surface of the polarizing plate 1, it is possible to prevent the separation of a protection film as in the conventional polarizing plate, for example, when the polarizing plate is attached to the optical apparatus and to easily handle the polarizing plate. Additionally, the transparent substrate 2 is exposed in the side surface of the polarizing plate 1, but the side surface of the polarizing plate 1 is located at the outer peripheral end portion. Accordingly, since the temperature of the side surface is not high as compared with the center portion of the polarizing plate 1 into and from which the light is incident and comes out even in a use state, a problem such as oxidization or corrosion hardly occurs.

Further, the side surface of the polarizing plate 1 is subjected to identification marking. Specifically, product information is printed by using laser marking, a marking pen, a diamond cutter, or the like. As described above, since the polarizing plate 1 according to the embodiment is formed so that the water-repellent layer 4 is not formed on the side surface thereof and the transparent substrate 2 is exposed, the side surface is hydrophilic. Accordingly, ink of a marking pen or the like is easily familiarized and marking can be reliably performed. Further, since a layer of coating the side surface is not formed, it is possible to prevent a conventional problem in which dust is caused due to the peeling of the protection film at the time of performing a printing operation using a laser marking or a diamond cutter. Thus, according to the embodiment, it is possible to reliably perform marking and hence to easily and reliably identify the polarizing plate 1.

[Method of Manufacturing Polarizing Plate 1]

(First Manufacturing Method)

Figure 3A:
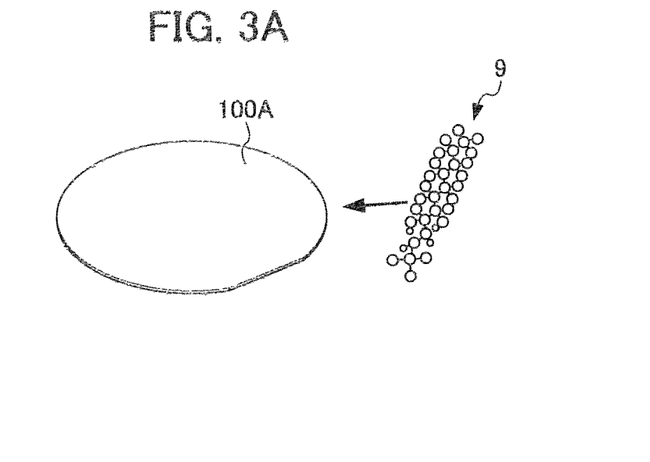
FIG. 3A is a diagram illustrating a polarizing plate manufacturing method according to the above-described embodiment.
Figure 3B:
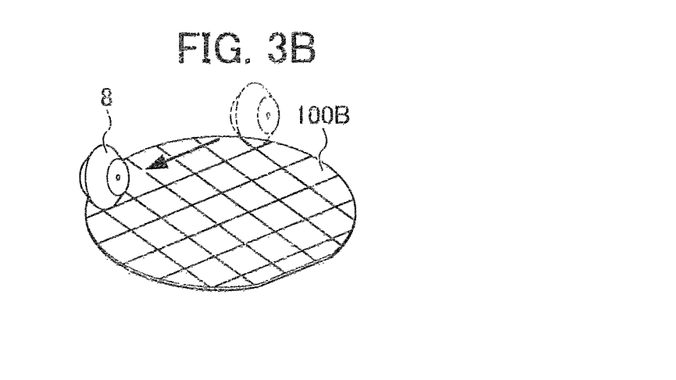
FIG. 3B is a diagram illustrating the polarizing plate manufacturing method according to the above-described embodiment.
Figure 3C:
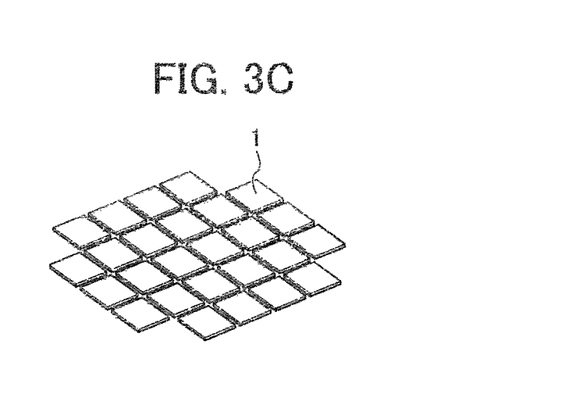
FIG. 3C is a diagram illustrating the polarizing plate manufacturing method according to the above-described embodiment.

A first manufacturing method of the polarizing plate 1 includes a grid-shaped convex portion forming step, a water-repellent layer forming step, and a cutting step. Hereinafter, these steps will be described in detail with reference to FIGS. 3A to 3C. Here, FIGS. 3A to 3C are diagrams illustrating a method of manufacturing the polarizing plate 1 according to the embodiment.

First, in the grid-shaped convex portion forming step, the grid-shaped convex portion 3 which extends in a predetermined direction is formed on one surface side of the transparent substrate 2 larger than the use size of the polarizing plate 1 at a pitch shorter than the wavelength of light of a use band. That is, in the first manufacturing method, the grid-shaped convex portion 3 is formed on the transparent substrate 2 larger than the use size of the polarizing plate 1.

The grid-shaped convex portion forming step includes, for example, a reflection layer forming step, a dielectric layer forming step, an absorption layer forming step, and an etching step. In addition, as described above, the dielectric layer forming step and the absorption layer forming step may be integrated to integrally form the dielectric layer and the absorption layer.

In the reflection layer forming step, the reflection layer is formed on the transparent substrate 2. In the dielectric layer forming step, the dielectric layer is formed on the reflection layer formed by the reflection layer forming step. In the absorption layer forming step, the absorption layer is formed on the dielectric layer formed by the dielectric layer forming step. In these layer forming steps, these layers can be formed by, for example, a sputtering method or a vapor deposition method.

In the etching step, the grid-shaped convex portion 3 which is arranged on the transparent substrate 2 at a pitch shorter than the wavelength of light of a use band is formed by selectively etching the lamination structure formed by the above-described layer forming steps. Specifically, a one-dimensional lattice-shaped mask pattern is formed by, for example, photolithography or nanoimprinting. Then, the grid-shaped convex portion 3 which is arranged on the transparent substrate 2 at a pitch shorter than the wavelength of light of a use band is formed by selectively etching the lamination structure. As the etching method, for example, a dry etching method using an etching gas corresponding to an etching object can be exemplified.

In the water-repellent layer forming step, as illustrated in FIG. 3A, the water-repellent layer 4 is formed to cover one surface of a large transparent substrate 100A provided with the grid-shaped convex portion 3. The water-repellent layer forming step includes, for example, a silica layer forming step and a silane coupling layer forming step.

In the silica layer forming step, the silica layer is formed of silica to cover one surface of the large transparent substrate 100A provided with the grid-shaped convex portion 3. Specifically, the silica layer is formed by using, for example, the above-described CVD or ALD. At this time, in the silica layer forming method, the silica layer is formed to cover both one surface and the other surface of the transparent substrate 100A.

In the silane coupling layer forming step, as illustrated in FIG. 3A, the silane coupling layer formed of a silane coupling agent 9 is formed on the surface of the silica layer formed by the silica layer forming step. Specifically, the silane coupling layer is formed by using dipping or the like other than, for example, the above-described CVD or ALD. At this time, in the silane coupling layer forming method, the silane coupling layer is formed to cover both one surface and the other surface of the transparent substrate 100A.

In the cutting step, as illustrated in FIG. 3B, a large transparent substrate 100B provided with the water-repellent layer 4 is cut into the use size of the polarizing plate 1. Specifically, first, a scribing groove (crack) is formed on the surface of the transparent substrate 100B by using, for example, scribing using a scriber 8. Next, the transparent substrate 100B is divided (broken) into individual pieces along the dividing groove to become a desired size.

As described above, in the first manufacturing method, since the large transparent substrate is used, the transparent substrate 100B is cut into a desired size suitable for the size of a liquid crystal panel or the like by this step. At this time, since the transparent substrate 100B provided with the water-repellent layer 4, the water-repellent layer does not exist on the side surface of the polarizing plate 1 obtained by cutting and the transparent substrate is exposed. With the above-described configuration, it is possible to manufacture the polarizing plate 1 which is cut into a desired size and in which the transparent substrate is exposed in the side surface as illustrated in FIG. 3C.

(Second Manufacturing Method)

A second manufacturing method of the polarizing plate 1 includes a grid-shaped convex portion forming step, a water-repellent layer forming step, and a removing step. Hereinafter, these steps will be described in detail.

In the grid-shaped convex portion forming step, the grid-shaped convex portion 3 extending in a predetermined direction is formed at a pitch shorter than the wavelength of light of a use band on one surface side of the transparent substrate equal to the use size of the polarizing plate 1. That is, in the second manufacturing method, the grid-shaped convex portion 3 is formed on the small oval transparent substrate equal to the use size of the polarizing plate 1. Additionally, the sequence of forming the grid-shaped convex portion 3 is the same as that of the first manufacturing method and, for example, the grid-shaped convex portion 3 is formed by the reflection layer forming step, the dielectric layer forming step, the absorption layer forming step, and the etching step.

In the water-repellent layer forming step, the water-repellent layer 4 is formed to cover one surface of the oval transparent substrate provided with the grid-shaped convex portion 3. The water-repellent layer forming step is the same as the water-repellent layer forming step of the first manufacturing method. At this time, in the method of forming the water-repellent layer 4, the water-repellent layer 4 is formed to cover both one surface and the other surface of the transparent substrate.

In the removing step, the water-repellent layer 4 formed on the side surface of the transparent substrate is removed by etching. As described above, in the second manufacturing method, since the small oval transparent substrate having the same size as that of the polarizing plate 1 is used, the cutting step as in the first manufacturing method is not necessary. Further, as described above, since the side surface of the polarizing plate 1 is also provided with the water-repellent layer 4, the water-repellent layer 4 formed on the side surface of the polarizing plate 1 is removed by this step. Specifically, the water-repellent layer 4 of the side surface is removed by desired etching or the like. With the above-described configuration, the polarizing plate 1 in which the transparent substrate is exposed on the side surface is manufactured.

[Optical Apparatus]

An optical apparatus according to the embodiment includes the polarizing plate 1. As the optical apparatus, for example, a liquid crystal projector, a head-up display, a digital camera, and the like can be exemplified. Since the polarizing plate 1 according to the embodiment is an inorganic polarizing plate having excellent heat resistance as compared with an organic polarizing plate, the polarizing plate is suitable for a liquid crystal projector, a head-up display, and the like requiring heat resistance.

For example, the polarizing plate 1 is fitted to an attachment frame (fixed frame) vertically provided inside an optical apparatus such as a liquid crystal projector so that the side surface is in contact with the attachment frame. Then, for example, an adhesive is supplied between the attachment frame and the side surface of the polarizing plate 1, so that the polarizing plate 1 is fixed to the attachment frame. At this time, since the side surface of the polarizing plate 1 according to the embodiment has hydrophilicity while the transparent substrate 2 is exposed, the side surface is familiar to the adhesive and can obtain high adhering strength. Accordingly, the side surface of the polarizing plate can be strongly fixed to the attachment frame. Further, since the water-repellent layer does not exist on the side surface, it is possible to prevent a problem in which the adhesive flows to the center of the polarizing plate 1 due to the capillary phenomenon of grid. Accordingly, it is possible to improve the productivity of the optical apparatus by improving the workability of the adhering operation.

Further, the invention is not limited to the above-described embodiment and modification and improvement within the scope of achieving the object of the invention are included in the invention.

In the above-described embodiment, the polarizing plate 1 is the absorption type polarizing plate and the grid-shaped convex portion 3 is the lamination structure of the reflection layer, the dielectric layer, and the absorption layer. However, the invention is not limited thereto. For example, the dielectric layer and the absorption layer may be integrated with each other. Alternatively, the grid-shaped convex portion may be formed by the reflection layer and the polarizing plate 1 may be the reflection type polarizing plate.

Further, in the above-described embodiment, the water-repellent layer 4 is also formed on the other surface of the polarizing plate 1 (a surface opposite to the surface provided with the grid-shaped convex portion 3), but the invention is not limited thereto. The water-repellent layer 4 may be formed on at least one surface of the polarizing plate 1 (a surface provided with the grid-shaped convex portion 3).

Further, in the above-described embodiment, the water-repellent layer 4 is formed to cover one entire surface of the polarizing plate 1 by including each groove between the adjacent grid-shaped convex portions 3, but the invention is not limited thereto. The water-repellent layer 4 may be disposed to cover at least the surface of the grid-shaped convex portion 3.

What is claimed is:

1. An optical apparatus comprising a polarizing plate with a wire grid structure and an attachment frame that holds the polarizing plate, the polarizing plate comprising:
   a transparent substrate; and
   a grid-shaped convex portion which is arranged on the transparent substrate on one surface side of the polarizing plate at a pitch shorter than a wavelength of light of a use band and extends in a predetermined direction,
   wherein a lower limit of a height of the grid-shaped convex portion is 10 nm,
   wherein a first surface of the polarizing plate is provided with a water-repellent layer which covers a surface of the grid-shaped convex portion,
   wherein a side surface of the polarizing plate is not provided with the water-repellent layer,
   wherein the grid-shaped convex portion comprises a reflection layer, a dielectric layer and an absorption layer in order from the transparent substrate,
   wherein the transparent substrate is exposed on the side surface of the polarizing plate, and
   wherein the polarizing plate is fitted to the attachment frame vertically so that the side surface is in contact with the attachment frame.

2. The polarizing plate according to claim 1,
   wherein the transparent substrate is exposed at a side surface of the polarizing plate.

3. The polarizing plate according to claim 1,
   wherein the side surface of the polarizing plate is subjected to an identification marking.

4. The polarizing plate according to claim 1,
   wherein a second surface of the polarizing plate is provided with the water-repellent layer.

5. The polarizing plate according to claim 1,
   wherein the water-repellent layer includes a silica layer formed of silica and a silane coupling layer formed of a silane coupling agent in order from the transparent substrate.

6. The polarizing plate according to claim 5,
   wherein the silane coupling layer includes fluorine.

7. The polarizing plate according to claim 1,
   wherein the transparent substrate is transparent to the wavelength of light of a use band and is formed of glass, crystal, or sapphire.

8. The polarizing plate according to claim 1, further comprising:
   a heat conduction plate which is disposed on a surface of the transparent substrate and is formed of sapphire.

9. A polarizing plate in an optical apparatus comprising the polarizing plate with a wire grid structure and an attachment frame that holds the polarizing plate, the polarizing plate comprising:
   a transparent substrate; and
   a grid-shaped convex portion which is arranged on the transparent substrate on one surface side of the polarizing plate at a pitch shorter than a wavelength of light of a use band and extends in a predetermined direction,
   wherein the grid-shaped convex portion comprises at least a reflection layer, a dielectric layer, and an absorption layer,
   wherein a lower limit of a height of the grid-shaped convex portion is 10 nm, wherein a first surface of the polarizing plate is provided with a water-repellent layer which covers a surface of the grid-shaped convex portion,
wherein a side surface of the polarizing plate is not provided with the water-repellent layer,
wherein the transparent substrate is exposed on the side surface of the polarizing plate, and
wherein the polarizing plate is fitted to the attachment frame vertically so that the side surface is in contact with the attachment frame.

* * * * *